Figure 1:
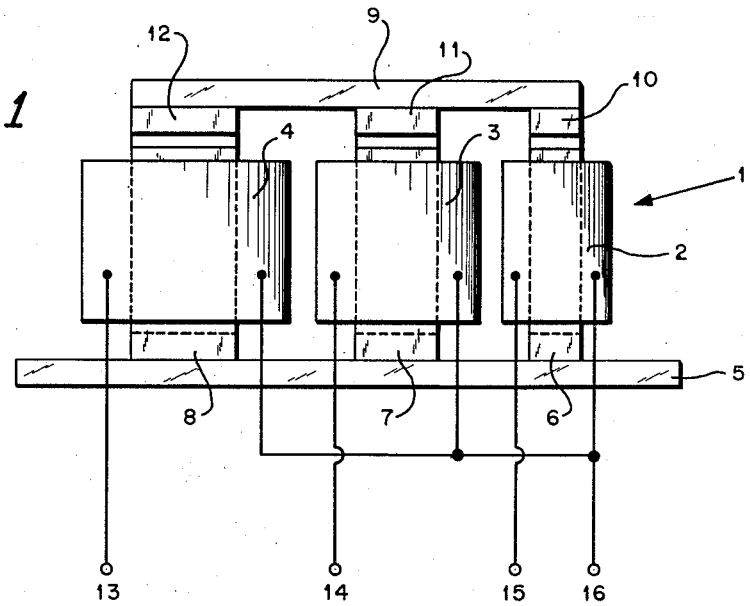

April 29, 1958     R. J. COPPOLA     2,832,920
FREQUENCY BAND RELAY

Filed Aug. 11, 1953     2 Sheets-Sheet 1

INVENTOR.
RICHARD J. COPPOLA
BY
*ATTORNEYS*

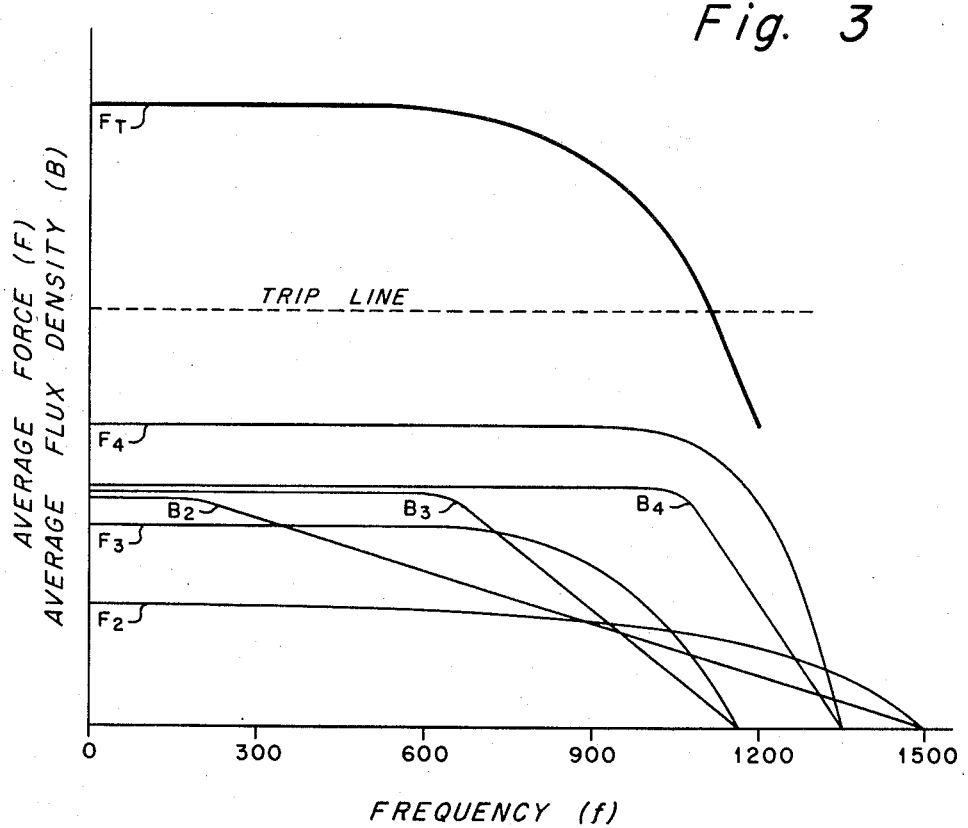

United States Patent Office 2,832,920
Patented Apr. 29, 1958

2,832,920

FREQUENCY BAND RELAY

Richard J. Coppola, Levittown, Pa.

Application August 11, 1953, Serial No. 373,699

6 Claims. (Cl. 317—188)

(Granted under Title 35, U. S. Code (1952), sec. 266)

The invention described herein may be manufactured and used by or for the Government of the United States of America for governmental purposes without the payment of any royalties thereon or therefor.

The instant invention relates to a frequency band relay and more particularly to a frequency band alternating current (A. C.) relay capable of operating over a wide frequency range.

Previous devices consisting of polyphase electromagnetic relays having several coils and a single armature have been known. However, these types of A. C. relays are restricted to operation over a very limited frequency range, and therefore, are basically incapable of satisfactory performance over a relatively large variation in electric power supply frequency, as manifested, for example, in the alternating current electrical system of an aircraft. Present means for rendering the relays in an electrical power system of an aircraft insensitive to frequency variations, which principally derive from changes in the engine speed of the aircraft, include provision of rectifiers, mechanical constant speed drives, saturable magnetic cores, etc. In many instances, the direct current electrical system incorporated in an aircraft directly provides energization of the relays, the contacts of which control power in alternating current circuits. While the utilization of rectifying elements are satisfactory, the inclusion of these components contributes to a greater degree the susceptibility of the relay to malfunctioning, in addition to the generation of heat. Mechanical constant speed drives are bulky and constitute a substantial additional weight, and therefore, the application of these devices is most common in larger aircraft wherein the weight penalty thus imposed can be tolerated more readily. Relays employing saturable magnetic cores are inherently more massive than is deemed desirable for installation in aircraft. Finally, the anticipated ultimate standardization of the aircraft electrical power systems using a purely alternating current type system would preclude binary operation as denoted above.

The instant invention consists of a relay assembly comprising a plurality of isolated magnetic circuits physically and consequently electrically different from one another, preferably designed to operate under three-phase A. C. voltage. The different magnetic circuits are predominately characterized by substantially dissimilar values of reluctance and correspondingly different values of electrical inductance so that over the operating range of the frequency band relay, each of the magnetic circuits independently saturates at a different point in the operating frequency range, providing in the composite relay assembly of the inventive device a relatively constant force for uniform actuation of a common armature assembly. In this manner, not only is a structure provided that is responsive to a wide band of frequencies, but also, the frequency band relay over its operational frequency range precludes excessive armature hammering, deemed to be especially detrimental because of its tendency to impart permanent magnetization to the magnetic core material. Substantial weight and volume economies are effected over existing devices denoted above, and in addition, a maximum degree of reliability of operation is afforded by the utilization of a minimum of coacting elements in the inventive frequency band relay.

Accordingly, an object of this invention is to obtain alternating current relay operation which is unaffected by large variations in electric power frequency.

Another object of this invention is to provide a polyphase alternating current relay construction for operation over a wide frequency band in which the use of rectifiers is eliminated.

Still another aim of the invention is to provide a polyphase alternating current relay in which the force for actuating the common armature assembly thereof is relatively constant over the operational frequency range, precluding thereby excessive hammering of the armature assembly.

Another purpose of the invention is to provide a plurality of magnetic circuits capable of moving in unison the cojoined armatures of a multiple relay assembly.

Still another aim of the invention is to provide a frequency band relay to obtain high speed operation over a relatively large variation in electric power supply frequency.

Still another object of the invention is to provide a relay assembly comprising a plurality of relays and responsive to a band of frequencies wherein each of the relays making up the relay assembly is designed to have approximately equal pull-in force within narrow frequency limits at the maximum frequency of the operating frequency band and a different pull-in force always greater than the pull-in force at the maximum frequency, yielding a composite total pull-in force which is substantially constant over the operating frequency band, and wherein saturation of magnetic circuits at the proper frequencies prevents pull-in forces from becoming excessive at lower frequencies.

Figure 2:
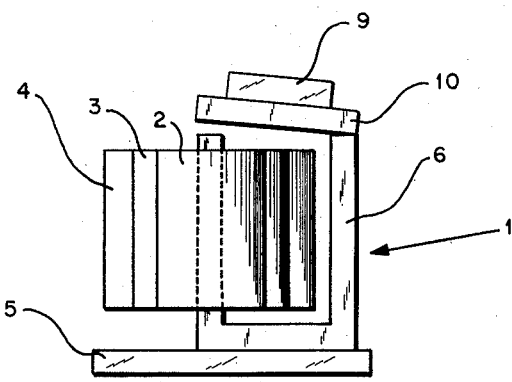

Other objects and many of the attendant advantages of this invention will be readily appreciated as the same becomes better understood by reference to the following detailed description when considered in connection with the accompanying drawings wherein:

Fig. 1 is a front elevational view of the frequency band relay assembly of the present invention, showing the electrical connections therein, Fig. 2 is an end elevation looking from the right of Fig. 1, and Fig. 3 illustrates representative curves for the instant embodiment shown in Figs. 1 and 2, indicating the average force (F) and average flux density (B) as a function of frequency ($f$) for constant applied voltage when plotted on linear scales.

Referring to the drawings, the frequency band relay 1 consists of a plurality of coils 2, 3, and 4, each coil having electrical parameters differing from the others. Connection is made to a source of operating power such as a 115/200 volts A. C. three-phase, 300 to 1200 cycle, power source. As shown by lead wires 13, 14, 15, and 16 and the electrical connections therein the coils may be connected in Y. A plurality of core members 6, 7 and 8 are of U-shape in cross section and each consists of a forward leg, a rear leg and a base member joining the legs. Disposed within coils 2, 3 and 4 respectively are the forward legs of core members 6, 7 and 8 respectively. The core members are mounted on a common base support 5 and spaced at intervals greater than the radii of the respective coils surrounding the respective core legs. Base support 5 is constructed of a non-magnetic material and may be rectangular in cross-sectional shape. A plurality of armatures 10, 11 and 12 are disposed above cores 6, 7 and 8 of respective coils 2, 3 and 4, and are designed to be brought toward mating relationship with the cores to complete the magnetic circuit. Armatures 10, 11 and 12 are supported by a common armature support arm 9 constructed of a non-magnetic material. Each of the three independent magnetic circuits constructed thereby has a different reluctance due to physical differences in each core and armature from the others. Consequently, the particular reluctance associated with each magnetic circuit is fundamental in determining the inductive property characterizing each of the coils of the composite relay assembly. Thus, coils 2, 3, and 4, are respectively characterized by relatively low, intermediate, and high values of electrical inductance. The total flux flowing in each magnetic circuit is necessarily also different in view of the respective divergent values of reluctance, as is understood. Conventional means may be used to permit the armature to close the magnetic circuit upon energization of the relay.

As shown in the drawings, the frequency band relay assembly is basically an assembly of three conventional relays and essentially comprises three isolated magnetic circuits physically different from one another. Each magnetic circuit is energized by a coil of wire 2, 3 or 4, each coil of wire being physically different from the other coils as in wire size, coil dimensions, number of turns, etc. These varying parameters consequently contribute to the variant electrical properties of these relay coils as previously noted, in accordance with inventive principles. The three relays are mounted on a common non-magnetic base 5 and their armatures 10, 11 and 12 are mechanically tied together with non-magnetic material 9 to isolate the magnetic circuits and to permit the three armatures to move in unison. The three coils may be electrically connected in Y. When a three-phase A. C. voltage which is within the operating frequency band of the relay is impressed on the terminals of the relay assembly, the three relays will pick up in unison and stay in this position until the A. C. voltage is removed. To make the ganged armatures of the relay assembly respond uniformly over a band of frequencies, each of the three relays making up the relay assembly is designed to have approximately the same pull-in force within relatively narrow frequency limits at the maximum frequency of the operating frequency band. At any other frequency within the operating frequency band, each relay will have an inherently greater pull-in force than the pull-in force at the maximum frequency, due to the increase of coil current with decrease of inductive reactance. Saturation of the magnetic circuits at the proper frequencies prevents the pull-in forces from becoming excessive at the lower frequencies. The above operational aspects of the instant embodiment can best be observed in relation to Fig. 3 in which are shown typical curves of average force (F), and the average flux density (B) of the frequency band relay as a function of frequency (f), when plotted on linear scales. The curves denoted by $B_2$, $B_3$ and $B_4$ are magnetic flux density curves indicative of the average density of flux in lines per unit area flowing in the magnetic circuits of relay coils 2, 3 and 4, respectively. The curves labelled as $F_2$, $F_3$ and $F_4$ show the individual average force contribution of each of the respective coils in pounds. The curve represented by $F_T$ is a composite total force curve of the individual average force contributions of each relay coil, and therefore denotes the total force in pounds instrumental in attracting the commonly joined armatures 10, 11 and 12, constituting an armature assembly. A horizontal trip line is indicated to show the relative level at which the armature assembly is actuated, overcoming the substantially constant restraint provided by any conventional retractile means, not illustrated in the drawings.

It will be observed in Fig. 3 that the dissimilar values of electrical inductance provided by the construction, as previously denoted, allow operation of the relay coils on the inclined portions of curves $B_2$, $B_3$ and $B_4$ only for a specific range of frequencies. At other frequencies, relay coils 2, 3 and 4 are subject to saturation as depicted in Fig. 3 by the horizontally disposed portions of the average flux density curves. In the sloping regions of these curves, operation is confined within the relatively straight-lined unsaturated portion of the B-H curve for the particular core material used. Thus, within the frequency range of interest between approximately 300 to 1200 cycles, it is apparent that during normal operation of the frequency band relay both saturated and unsaturated conditions of operation are evidenced, and that the inductive reactance of a coil is of significance only when operation at a particular frequency falls on the inclined portions of the average flux density curves $B_2$, $B_3$ and $B_4$. At 900 cycles, for example, the average magnetic flux density associated with coils 2 and 3 as denoted by curves $B_2$ and $B_3$, respectively, is substantially less than the saturable level, and the inductive reactance is fundamental in the respective impedances of these coils to control the excitation current therein. The magnetic circuit of coil 4, however, is saturated at this particular frequency since the excitation current has reached a limiting value, restricted in this instance only by the resistance of the coil. Thus, the particular values of current flowing in coils 2, 3 and 4, directly yield the average value of flux densities $B_2$, $B_3$ and $B_4$, respectively, indicated for this frequency. The fluxes associated with these densities in turn produce forces which when taken in the aggregate result in a substantial constant total force over a wide frequency range, as indicated by the total force curve $F_T$. Therefore, in accordance with the foregoing inventive principles, the instant embodiment provides a frequency band relay having substantially constant armature actuating force characteristics over the operational frequency range of interest.

Polyphase A. C. electric power is used so that when the instantaneous flux in one magnetic circuit is going through zero (0), the fluxes in the other magnetic circuits have a definite value other than zero (0). This results in the armature staying closed continuously during the period that a specified voltage is applied to the coils.

From the foregoing description it is apparent that a polyphase electro-magnetic relay assembly is provided having several coils and effectively a single armature. Several independent magnetic circuits are provided, each having a different reluctance, and a plurality of coils are provided each coil having different electrical parameters. Each magnetic circuit is energized by a coil of wire also physically different from the others such as in wire size, coil dimensions, number of turns, etc. These differing parameters are differing reluctance magnetic circuits are fundamental to obtaining the divergent values of electrical inductance commensurate with the necessary flux for producing a constant force for actuating the armature assembly of the frequency band relay over a comparatively wide range of frequencies. Thus the object of obtaining A. C. relay operations unaffected by large variations in electric power supply frequency is accomplished and high speed operation over the relatively large variation in the electric power supply frequency is possible. In addition, the substantially constant armature actuating force provided over the comparatively wide frequency range precludes excessive armature hammering, deemed especially to be detrimental because of its tendency to impart permanent magnetization to the core material, apart from the adverse physical changes which may be effected thereby such as enlargement of the air-gap. The armatures are mechanically tied together with a support member of non-magnetic material to isolate the magnetic circuits and to permit the armatures to move in unison. The coils are shown electrically connected in Y for multi-phase A. C. voltage operation, but of course, other conventional types of connections are applicable within the ordinary skill of the art, such as the delta. Thus, the instant embodiment in accordance with inventive principles provides a frequency band relay in which substantial weight and volume economies are effected over existing devices currently incorporated in an aircraft. In addition, a maximum degree of reliability of operation is afforded by utilizing a minimum of coacting elements to carry out the function of the frequency band relay.

It is to be understood that many alternate methods of construction are possible without deviating from the principles taught in the illustrative embodiment and in the invention herein disclosed. Many possible configurations of the magnetic circuits and the physical arrangements of the coils and magnetic circuits as well as adaptation of other frequency band relay constructions to electrical systems having any number of phases are possible without departing from the inventive principles herein illustrated. Although the instant embodiment is herein depicted as having application in polyphase aircraft power systems, the devices may be adopted for single phase operation without resort to slugs, shorted turns, or rectifiers, since an out-of-phase flux relationship exists between respective coils within the operational frequency range of interest of approximately 300 to 1000 cycles by virtue of the selective saturation principle employed. The invention may be adapted for use in various other types of relays than the one illustrated in the illustrative embodiment.

Obviously many modifications and variations of the present invention are possible in the light of the above teachings. It is therefore to be understood that within the scope of the appended claims the invention may be practiced otherwise than as specifically described.

What is claimed is:

1. A polyphase frequency band relay comprising a base of non-magnetic material, a plurality of relays mounted thereon, each of said relays having a coil and an armature, each of said coils having a value of electrical inductance different from the others, thereby forming relays in which the magnetic circuits thereof are saturable at the proper frequencies over the operating range of said polyphase frequency band relay, a plurality of lead wires for energizing each of said relays, the armatures of said relays being mounted on a common non-magnetic rigid support member to isolate the magnetic circuits and to compel the several armatures forming an armature assembly to move as a unit upon excitation of the coils, said lead wires being connected to a source of polyphase alternating current voltage for supplying excitation to the coils of said relays, whereby the relays are responsive upon excitation thereof to provide a substantially constant total force for uniform actuation of said armature assembly over a comparatively wide operating range of frequencies.

2. A broad frequency band relay comprising a base of non-magnetic material, a plurality of U-shaped core members of magnetic material, each of the core members having a forwardly disposed leg, a rearwardly disposed leg and a connecting member, each connecting member being secured to the non-magnetic base, a coil member disposed circumferentially about the forward leg of each core member, said cores being spaced along said non-magnetic base a distance greater than the radius of respective coil members, a support arm of non-magnetic material, a plurality of armatures mounted in spaced relationship along said support arm forming an armature assembly and disposed to fit over respective core members, said armatures and said core members forming magnetic circuits, said armatures being responsive upon excitation of said coil members to open and close the magnetic circuits, thus opening and closing relay contacts, means to supply polyphase excitation to said coil members, each of said coil members having a different value of electrical inductance from the others, whereby said magnetic circuits are saturable at the proper frequencies over the operational frequency range of said broad frequency band relay, providing a substantially constant total force for uniform actuation of the armature assembly throughout the operational frequency range.

3. A broad frequency band relay comprising a plurality of isolated magnetic circuits, each circuit including a core and an armature and being characterized by a substantially different reluctance, and a plurality of coil members mounted upon the respective cores, each coil member being substantially different in value of electrical inductance to effect saturation of said magnetic circuits at the proper frequencies over the operating range of said frequency band relay, common non-magnetic means to support said cores and said armatures at spaced intervals thereon, and means to introduce polyphase electrical excitation to said coil members.

4. A broad frequency band relay comprising a non-magnetic material base member, a plurality of core members mounted at spaced locations along said base member, a corresponding plurality of coil members disposed about the respective core members, input means to provide power excitation for said coil members, said input means comprising a plurality of leads connected in electrical Y-connection and a source of polyphase alternating current excitation power covering a relatively wide range of frequencies, a plurality of armatures disposed in proximity to the respective core members, means to selectively move said armatures in unison toward and away from said core members, said means comprising a rigid non-magnetic support arm to which the respective armatures are fixedly secured, a plurality of magnetic circuits formed by the respective core members and armatures and electrically separated by said base member and said support arm to isolate the respective circuits, each of the magnetic circuits having a different reluctance than the others and each of the coil members having a corresponding value of electrical inductance different from the other coil members, whereby the different inductances of the coil members and the different reluctances of the magnetic circuits provide saturation of said magnetic circuits at the proper frequencies to produce a substantially constant total force over a relatively wide range of frequencies to uniformly move said armatures toward and away from said core members in response to electrical excitation of the coil members.

5. A relay assembly operable over a broad frequency band comprising a base support of non-magnetic material, first, second, and third U-shaped core members of magnetic material, each of the core members having a forwardly disposed leg, a rearwardly disposed leg and a connecting member, the respetcive connecting members being secured to the non-magnetic base support at spaced locations thereon, first, second, and third coil members disposed circumferentially about and supported by the forward legs of the respective core members, input means to provide power excitation for said coil members, said input means comprising three pairs of leads connected in electrical Y-connection and a source of three phase alternating current excitation power covering a relatively wide range of frequencies, first, second, and third armatures disposed in proximity to the respective core members, means to selectively move said armatures collectively toward and away from said core members, said means comprising a rigid non-magnetic support arm to which the respective armatures are fixedly secured at spaced locations, first, second, and third isolated magnetic circuits formed by the respective core members and armatures and electrically separated by said base support and said support arm, each of the magnetic circuits having a different reluctance than the others and each of the coil members having a corresponding value of electrical inductance different from the other coil members, whereby the differing values of inductances of the coil members and the differing reluctances of the magnetic circuits provide saturation of said magnetic circuits at the proper frequencies to produce a substantially constant total force over a relatively wide range of frequencies for uniform movement of said armatures in unison toward and away from said core members in response to electrical excitation of the three coil members.

6. A polyphase frequency band relay operable over a comparatively wide range of frequency variations comprising a plurality of electromagnetic relays adjacently disposed for common attraction and having magnetic circuits of negligible mutual coupling, each of said relays having an armature and a coil, means for ganging said armatures to form an armature assembly to thereby effect movement of the armatures in unison, said coils having diverse values of electrical inductance and being connected to a polyphase alternating current source of excitation, whereby the magnetic circuits of said relays are responsive upon excitation to saturation at the proper frequencies over the operating range of said polyphase frequency band relay to produce a substantially constant total actuating force for effecting uniform actuation of said armature assembly over said comparatively wide range of frequency variations.

References Cited in the file of this patent

UNITED STATES PATENTS

| | | |
|---|---|---|
| 1,241,157 | Simon | Sept. 25, 1917 |
| 1,549,658 | Ellefsen | Aug. 11, 1925 |
| 2,131,424 | Bechberger | Sept 27, 1938 |
| 2,480,452 | Dole | Aug. 30, 1949 |